United States Patent Office 2,945,770
Patented July 19, 1960

2,945,770
NACREOUS MOLYBDENUM DISULFIDE

Lawrence Suchow, New York, N.Y., assignor to Francis Earle Laboratories, Inc., Peekskill, N.Y., a corporation of New York No Drawing. Filed Dec. 4, 1957, Ser. No. 700,558

4 Claims. (Cl. 106—148)

This invention relates to nacreous pigments of molybdenum disulfide and is a continuation-in-part of copending application Serial No. 630,743, filed December 27, 1956, now abandoned.

Transparent substances which have a high index of refraction and are in the form of thin, plate-like crystals are commonly used to produce a nacreous, mother-of-pearl effect. The optical effect can be achieved either by coating the surface of an object with a vehicle containing such crystals or by incorporating the crystals within light-transmitting substances, in which case the optical effect becomes an integral part of the object.

Integral mother-of-pearl effects can be produced with many transparent or translucent substances by incorporation of the nacreous material within the substance itself. For example, simulated mother-of-pearl knife handles and fountain pen barrels can be made by incorporating a nacreous pigment in a plastic, such as cellulose acetate, which is then molded into the appropriate shape. Simulated pearl buttons are made from discs which are cut from acrylic or polyester sheets containing oriented pearly pigment; the nacreous pigment is suspended in the appropriate polymerizable resin, which is then cast to form a solid sheet in which the nacreous effect is incorporated. It is important in this application that the plate-like crystals have the proper orientation at the time of gelation.

To produce pearly luster in surface coatings, nacreous pigments are suspended in a light-transmitting, film-forming vehicle which is applied to a surface so that the thin, plate-like crystals of the pigment lie parallel to one another and generally perpendicular to incident light. The nacre is caused by simultaneous reflection of light from the many parallel surfaces at different depths, which produces a velvety pearl-like luster rather than the metallic mirror-like luster characteristic of light reflected from a single surface.

Pearl Essence, which is a guanine composition derived from fish, and lead hydrogen phosphate are examples of effective nacreous pigments.

A nacreous or pseudo-nacreous effect is also obtained when the pigment consists of opaque, plate-like particles. In this case, the effect is due entirely to reflection from the top layer of particles, and the three dimensional effect obtained is due to variation in the height of the top layer of pigment particles in the film, coating or plastic. Aluminum flake is an example of this type of pigment. The pigment of the present invention falls somewhere between these two categories, resulting in a dark blue pearly luster which is opaque to most visible light.

In pigments of this type, it becomes a problem to produce lustrous color effects which have high heat stability. Such effects are not generally attainable through the use of dyes which are further limited as to the shade or tone of a given color which may be produced.

Accordingly, it is an object of the present invention to provide novel compositions which will produce a lustrous colorful nacre.

Another object is to provide methods for preparing such compositions.

Still another object is to provide a lustrous nacreous pigment of high heat stability.

A further object of this invention is to provide articles of manufacture in which are incorporated novel-nacre-producing pigments.

These and other objects of this invention will become apparent from the following description:

It has been found that nacreous pigments of molybdenum disulfide produce an excellent dark blue nacre with very good luster and have, at the same time, high heat stability. Since the $MoS_2$ crystals are substantially opaque, the nacreous effect being caused by reflection of incident light from the crystals.

One method of making the molybdenum disulfide crystals which will produce the desired nacreous effect is by reacting $MoO_3$ and sulfur. More specifically, a nacreous molybdenum disulfide pigment is prepared by heating to elevated temperatures (preferably red heat) in covered vessels, mixtures of molybdenum trioxide ($MoO_3$) and sulfur, in any desired proportion. Best results are obtained, however, when the mixture contains approximately 50–60 weight percent $MoO_3$. The reaction product is air-quenched, cooled, and dispersed by heating in water. After filtration and washing, the rod-like crystals obtained generally have a size range of from 1 to 30 microns long and up to 12 microns wide, although the length of such crystals may sometimes go as high as 50 microns. The thickness of the $MoS_2$ crystals is not a material factor in determining their nacre-producing ability so long as they are sufficiently thick to be substantially opaque. A thickness of one micron or less is generally sufficient to produce the desired opacity.

Specific example

Fifty-seven parts, by weight, of $MoO_3$ are mixed with forty-three parts of sulfur and the mixture is placed in a covered crucible or other container. The mixture is then heated at about 650° C. for about 20 minutes, after which cooling is accomplished rapidly by air-quenching. The product is leached with hot water, the suspension filtered, and the pigment washed with water. The pigment was in the form of rods having an average size of 12 x 3 microns and an average thickness of about 0.5 micron.

The crystals produced by the above procedure, when suspended in water or in an organic solvent, produce on stirring, the silky or pearly appearance which is typical of nacre-producing crystals. The motion of the liquid causes the crystals to be oriented with respect to each other, and luster is produced as light is reflected from numerous crystal faces. These crystals may be accompanied by certain impurities such as $MoO_2$ which do not contribute to the nacreous effect. However, in following the methods disclosed herein, when the amount of such impurities does not exceed 25 percent, a satisfactory product is obtained.

The form in which the nacre-producing crystals are commonly prepared is that of a paste which contains as the vehicle thereof, a light-transmitting, preferably clear liquid which is compatible with lacquers, resins, and plastics. For certain applications, it is desirable to use the nacreous pigment in the form of a dry powder, although drying often causes a partial loss in luster through agglomeration of individual crystal platelets. Other applications utilize the nacre-producing crystals in aqueous suspension.

For surface coating, the molybdenum disulfide nacre-producing crystals of the present invention can be suspended in a cellulose nitrate lacquer. However, there may be substituted almost any of the well known clear lacquers as the vehicles for the pigment. Moreover, the pigment may also be incorporated in a light-transmitting (transparent or translucent) plastic material such as cellulose acetate, the alkyd resins, the vinyl resins, as well as acrylic acid ester resins, or polyester casting resins.

A typical paste composition useful for stock material to be diluted to a useful concentration level is the following:

1 part (by weight) nacreous molybdenum disulfide
2 parts (by weight) cellulose nitrate lacquer The lacquer may be a formulation such as the following:

|  | Percent |
|---|---|
| Cellulose nitrate (15–20 seconds) | 8 |
| Ethanol | 3–20 |
| Amyl acetate | 89–72 |

The water washed crystals which have been described above can be made compatible with a lacquer of this type by being washed with a suitable water-miscible organic solvent, such as ethanol.

When used to make simulated pearls by the coating of alabaster glass or plastic beads, the lacquer paste containing one-third nacreous pigment is further diluted with a clear cellulose nitrate lacquer of the appropriate viscosity. Such lacquers, suitable for coating objects by dipping, spraying, etc., for the best results should contain 0.5 to 5 percent molybdenum disulfide crystals.

The solvent, instead of containing primarily amyl acetate as indicated in the above example, may comprise butyl acetate, acetone or other commonly used organic solvents.

For incorporation in a plastic, such as poly (methyl methacrylate), it is convenient to disperse the nacreous crystals in a plasticizer rather than in a lacquer formulation. A suitable composition for this purpose is:

|  | Percent |
|---|---|
| Nacreous molybdenum disulfide | 25.0 |
| Acetone | 20.0 |
| Dibutyl phthalate | 55.0 |

The pigment paste is blended with a plastic molding powder, such as poly (methyl methacrylate), in such quantity as to yield a final concentration in the plastic of approximately one percent nacreous pigment. The plastic can be extruded into rods, injection molded into various shapes, etc.

For use in casein plastics, where the presence of organic solvents is not necessary, it is most convenient to prepare the nacreous pigment in the form of a paste in water. The desired quantity of this aqueous paste is then incorporated in the casein powder prior to processing. Generally the desired effects are obtained when the concentration of molybdenum disulfide is 0.5 to 5 percent of the weight of the casein.

In the foregoing, the invention has been described only in connection with preferred embodiments thereof. Many variations and modifications of the principles of my invention within the scope of the description herein are obvious. Accordingly, it is preferred that this application be bound not by the specific disclosure herein, but only by the appending claims.

I claim:
1. A nacreous composition comprising a paste having as a nacre-producing substance therein molybdenum disulfide crystals having a length in the range of about 1 to 50 microns, a width not greater than about 12 microns, and a thickness not greater than about 1 micron, said crystals being suspended in a light-transmitting supporting medium.

2. The composition of claim 1 in which the molybdenum disulfide particles are suspended in a cellulose-nitrate lacquer.

3. A light-transmitting nacreous plastic article of manufacture having suspended therein as a nacre-producing substance, a dispersion of molybdenum disulfide particles in crystalline form, the particles having a length in the range of about 1 to 50 microns, a width not greater than about 12 microns, and a thickness not greater than about 1 micron.

4. The article of claim 3 in which the plastic is a casein resin and the crystals of molybdenum disulfide are present in the amount of from about 0.5 to 5 percent of the total composition.

References Cited in the file of this patent

UNITED STATES PATENTS

| 1,607,624 | Higgins | Nov. 23, 1926 |
| 2,363,570 | Caprio | Nov. 28, 1944 |
| 2,505,744 | Scalera et al. | Apr. 25, 1950 |
| 2,579,020 | Smith | Dec. 18, 1951 |
| 2,605,167 | Obrien | July 29, 1952 |
| 2,770,527 | Alderson et al. | Nov. 13, 1956 |
| 2,851,370 | Blank | Sept. 9, 1958 |

OTHER REFERENCES

Mellor: "Comprehensive Treatise on Inorganic and Theoretical Chemistry," vol. 11, 1931, pages 641–645.
Mellor, vol. II, pages 640–642 (1931).